June 9, 1959  J. B. COPENHEFER  2,889,759
FILM HANGER
Filed Aug. 8, 1955

INVENTOR.
JOHN B. COPENHEFER
BY
Arthur Robert
ATTORNEY

United States Patent Office 2,889,759
Patented June 9, 1959

2,889,759
FILM HANGER

John B. Copenhefer, Louisville, Ky., assignor to Brown-Forman Distillers Corporation, Louisville, Ky., a corporation of Delaware Application August 8, 1955, Serial No. 527,087

5 Claims. (Cl. 95—100)

The present invention relates to a hanger for carrying photographic film, such as, X-ray plates, through a developing machine.

In the operation of automatic developing machines, the film is clamped in suitable hangers, which are then loaded into the machine to develop the film. The clamping of the film in the hanger is done in the dark room, and, therefore, with the hangers in current use, considerable fumbling is involved in attaching or clamping the film in the hanger.

It is an object of the present invention to provide a film supporting hanger which can be easily loaded in a dark room without fumbling.

Another object is the provision of a film supporting hanger which is easily loaded and is adjustable for accommodating different lengths of film.

A further object is the provision of a film support hanger which may be easily and quickly unloaded.

In accordance with the present invention, the hanger comprises a frame having clamp supports at each end, the clamp supports being biased apart. The clamp supports each carry a pair of clamps in fixed position, and each clamp has an operating member extending from one face and so disposed that when the frame is placed on a surface and pushed against the surface, the clamps are opened to receive the film.

The hanger preferably is employed in conjunction with a loading plate for loading the film. This loading plate positions the film in the frame ready to be moved into the clamps. The procedure for clamping the film is as follows: The lower end of the frame is manually pressed against the loading plate to open the clamps carried by the lower clamp supporting member, and the film then is slid downwardly along the loading plate till the end enters the clamps. The lower end of the frame then may be released, if desired, to allow the jaws of the clamps to close and hold the lower end of the film. Now the upper end of the frame is pushed against the loading plate to open the clamps carried by the upper clamp supporting member and the lower clamp supporting member is compressed toward the upper clamp supporting member, thus shifting the film into position where the upper edge of the film enters the upper clamps. Now holding the frame compressed it is lifted off the loading plate, thus allowing the clamps to close on the film. The compressive force now can be released and the clamps then hold the film under tension in the frame.

The film is easily removed from the frame, after development, by the use of an inclined releasing plate having a guide or stop at the bottom. The frame is placed on the releasing plate and is allowed to fall or topple against the plate. Thus, the lower clamp operating members first engage the plate, which releases the lower clamps, and by means of bosses at the lower end, the lower end of the film is deflected upward out of alignment with the lower clamps. Now, when the upper clamps strike the releasing plate the upper clamps are opened to release the film, which now slides downwardly over the frame till it engages the stop.

The invention is described in detail in the following specification taken in connection with the accompanying drawing illustrating a preferred embodiment of the invention by way of example, and wherein.

Figure 1:
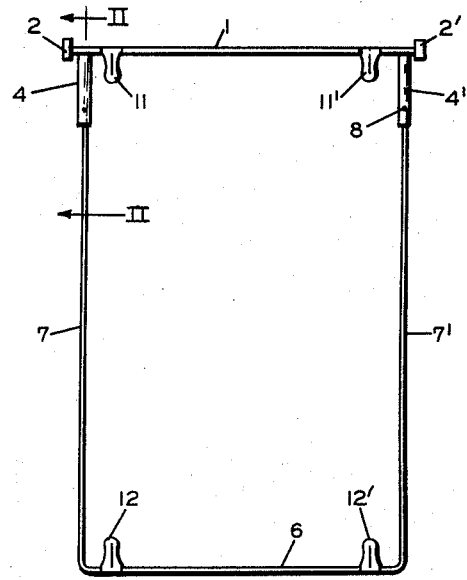
Figure 1 is an elevation view of the rear face of the frame.
Figure 2:
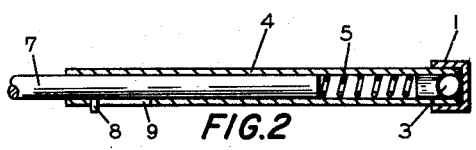
Figure 2 is a fragmentary section taken on line 2—2 of Figure 1.

Referring to Figures 1 and 2, the frame comprises an inverted channel bar 1 at the top, which at the ends receives terminal blocks 2, 2' which serve to support the frame in the developing machine. Angle rods, 3, are suitably secured in the channel adjacent each end, as by welding, and sleeves, 4, 4' are suitably attached to the angle rods, so that the top bar 1 and sleeves 4, 4' constitute an inverted or upper U-shaped frame portion. Each sleeve contains a helical compression spring 5. A lower U-shaped wire frame has a bottom bar 6 and side bars 7, 7' and the upper ends of the side bars are telescopically received respectively in one of the sleeves 4, 4'. A pin 8 extends radially from each side bar near its end through a slot 9 in each sleeve, so as to allow limited telescopic movement of the ends of the lower U-frame in the sleeves.

A pair of clamps 11, 11' are secured at the top to the channel bar 1, as by welding, and a like pair of clamps 12, 12' are similarly secured to the bottom bar 6. As these clamps are identical, only one will be described in detail.

Figure 3:
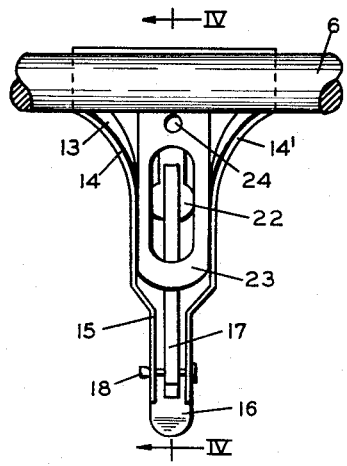
Figure 3 is a plan view of a clamp.
Figure 4:
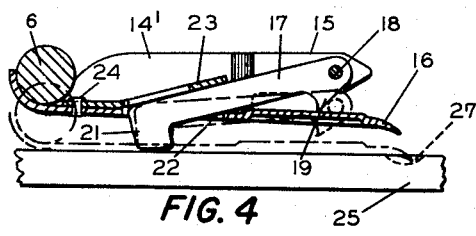
Figure 4 is a section taken on line 4—4 of Figure 3, and showing the operation of the clamp.

Referring to Figs. 3 and 4, the clamp comprises a frame 13 formed from a flat sheet by bending upwardly the side flanges 14, 14' and slitting and bending inwardly the forward part of the plate to provide a yoke 15 and tongue 16. This tongue may be suitably ribbed for reenforcement and its end is bent slightly downwardly and flattened in a relatively dull chisel edge. The part of the sheet adjacent the tongue that is bent inwardly on each side to provide the yoke, overhangs the tongue. The rear flat end of the clamp is secured to the rod 6 by welding or soldering.

A lever or jaw 17 is pivoted in yoke 15 on a pivot pin 18, and this jaw has a lower clamping cam edge 19 adjacent the pivot. The other end 21 of this jaw lever extends downwardly in angular relation and projects through a suitable aperture 22 in the plate. A leaf spring 23 riveted at 24 to one end to the plate is bowed against the lever 17. It will be seen that when end 21 is raised the cam edge 19 is moved away from the tongue 16, and upon release of the end 21 the cam edge 19 is moved by spring 23 toward the tongue. In this latter position a film is held clamped between tongue 16 and cam 19.

The positioning of a film in the frame now will be described. A suitable flat board or loading plate 25 has a stop 26 extending from the top edge, and the frame is positioned on this board with the blocks 2, 2' overhanging the top edge, one block 2 abutting the stop. If desired, the board may provide depressions 27 located adjacent the ends of the tongues 15 so that the chisel ends of the tongues can lie in these depressions substantially flush with or below the board surface. When the frame is laid on the board, the ends 21 of the operating levers of the four clamps rest on the board and support the frame and tongues 16 slightly raised from the board surface, as shown in full lines Figure 4. It will be understood, the springs 23 are strong enough to support the weight of the frame on the ends 21 of the clamp levers. Now, when the frame is pushed down against the board the levers 17 yield to allow the tongues 16 to contact the board, as shown in dot and dash lines, and the yielding of levers 17 moves cams 19 to open the jaws of each clamp. When the pressure on the frame is released, the levers 17 can move the jaws 19 to clamping position, and at the same time the clamp tongues are raised from the board.

Figure 5:
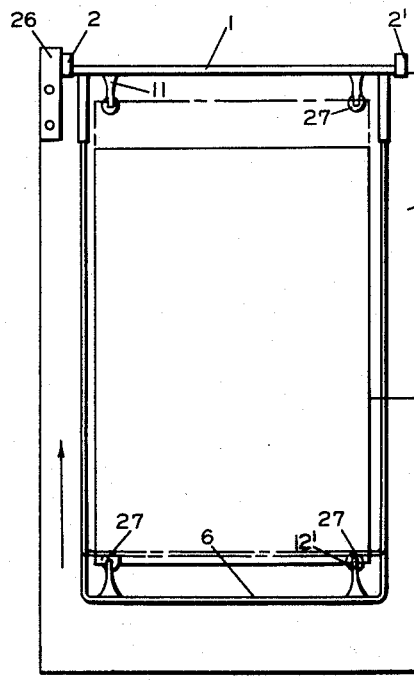
Figure 5 is a plan view of the frame positioned on the film loading plate.

After the frame is positioned on the board, a film 28 to be treated is placed on the board, and while the end 6 of the frame is pressed against the board the film is slid downward till its lower edge enters the open jaws, in the position shown in Fig. 5 in full lines. Now, upon release, the springs 23 acting on levers 17 cause the frame to rise, and at the same time the springs 23 close the jaws to grasp the lower edge of the film in clamps 12, 12'. At the upper end, the channel member 1 now is pressed firmly against the board, and at the same time the frame 6, 7, 7' is compressed against the bias of springs 5, as indicated by the arrow, to move the lower end of the frame upward. This moves the film upward and the upper edge of the film enters the jaws 11, 11', as shown in dot and dash lines. Now, holding the frame compressed in this manner it is lifted from the loading board to allow all the jaws to close to grasp the film, and then the compressive force is released so the springs 5 expand the frame until the film is under slight tension, the expansion of the frame being limited by the bite of the jaws on the film. The frame now may be placed in the developing machine.

Figure 6:
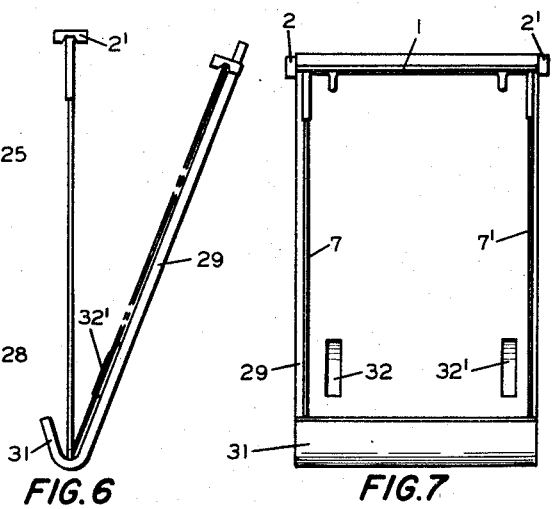
Figure 6 is a side elevation of the frame on a film releasing plate.
Figure 7:
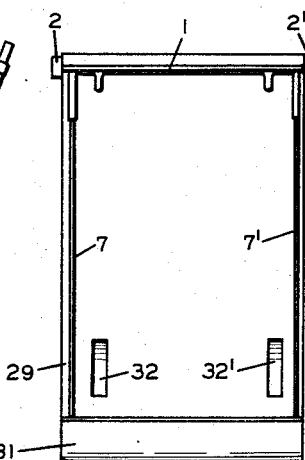
Figure 7 is a front view of Figure 6.

The removal of the film from the frame, after being developed, is explained in connection with Figs. 6 and 7. The removing fixture comprises an inclined releasing plate 29 having a trough 31 near the bottom, and bosses 32, 32' projecting from the plate at a short distance above the bottom. The width of the releasing plate is such that the blocks 2, 2' extend beyond the sides, and the length of the releasing plate is somewhat greater than the frame distance between bars 1 and 6.

The frame is placed in the trough 31 with the operating ends 21 of the cam levers facing the releasing plate. The frame then is released and falls against the releasing plate. The lower clamps first engage the releasing plate so as to open the lower jaws and release the lower edge of the film, and the bosses 32, 32' lift the film edge over the lower clamps. The upper clamps now engage the releasing plate to open the upper jaws and release the upper edge of the film, and the film drops till its lower edge engages the trough bottom. The film now is free of the frame and can be removed.

The construction illustrated enables the film to be easily inserted into the carrying frame in a dark room, as it is not necessary for the operator to find the jaw operating levers, nor is it necessary to see the film and clamps to guide the film into the clamps. Also, the film can be released from the frame in the single operation of placing the frame on the releasing plate, the release being automatically accomplished when the frame falls against the releasing plate.

I claim:

1. A hanger for photographic film comprising: a frame having front and rear sides and opposed upper and lower frame members relatively movable toward and normally biased away from each other; a plurality of spring closed jaw clamps carried by each frame member with the clamp jaws extending toward the opopsed frame member and cooperating with the clamp jaws on the opposed frame member to hold a film stretched threbetween, said clamps being arranged to receive and discharge such film on the front side of said frame; each of said clamps including a jaw operating member projecting from the rear side of said frame and being operative, as the rear side of said frame is pressed against a flat surface, to effect the opening of its jaw clamp for film receiving and discharging purposes.

2. The hanger of claim 1 in combination with: a film loading plate having depressions in its surface for receiving portions of said clamps so that when said frame is pressed against said plate, the open mouths of said jaws will be positioned substantially in the plane of said plate surface to receive a film supported on said surface.

3. The combination of claim 2 wherein: said loading plate has a gauge member adjacent one edge to index said frame thereon.

4. The hanger of claim 1 in combination with: a film releasing plate presenting an inclined surface having a projecting stop adjacent its lower edge adapted to receive the lower end of said frame; said jaw operating members causing said clamps to open as the rear side of said frame is pressed against said inclined surface; said plate also having bosses, extending from said surface adjacent said lower edge and above said stop, to deflect the film over the lower clamps when the upper clamps are released.

5. The hanger of claim 1 wherein: each of said clamps has a jaw fixed on its frame member, and a movable jaw, said movable jaw comprising a lever pivoted adjacent one end on said fixed jaw, the other end of said fixed lever curving substantially at a right angle and projecting through said fixed jaw to provide said jaw operating member, and a cam edge extending from said lever toward said fixed jaw and located between said pivoted end of said lever and said jaw operating member and adapted to cooperate with said fixed jaw to hold a film therebetween.

References Cited in the file of this patent

UNITED STATES PATENTS

| | | |
|---|---|---|
| 1,237,562 | Schoenberg | Aug. 21, 1917 |
| 1,365,975 | Folmer | Jan. 18, 1921 |
| 1,929,283 | Miller | Oct. 3, 1933 |
| 2,429,358 | Kamiss | Oct. 21, 1947 |

FOREIGN PATENTS

| | | |
|---|---|---|
| 207,952 | Great Britain | Dec. 13, 1923 |
| 644,210 | Great Britain | Apr. 26, 1937 |